Oct. 3, 1933.    A. FRISCH    1,929,353

MOTION PICTURE PROJECTING APPARATUS

Filed Sept. 14, 1932    2 Sheets-Sheet 1

INVENTOR-
*Arthur Frisch*
BY
ATTORNEY-

Oct. 3, 1933.   A. FRISCH   1,929,353
MOTION PICTURE PROJECTING APPARATUS
Filed Sept. 14, 1932   2 Sheets-Sheet 2

INVENTOR-
Arthur Frisch
BY
ATTORNEY-

Patented Oct. 3, 1933

1,929,353

UNITED STATES PATENT OFFICE 1,929,353

MOTION PICTURE PROJECTING APPARATUS

Arthur Frisch, Brooklyn, N. Y.

Application September 14, 1932
Serial No. 633,057

4 Claims. (Cl. 88—16.6)

This invention relates to motion picture projecting apparatus, and has for its general object and purpose to provide an apparatus of this kind which may be inexpensively manufactured and sold at a comparatively small price and is primarily designed for use as a toy. To this end, a film is provided for use in the machine having two rows of images to simultaneously register with light apertures over which the film is moved, the image bearing light beams being projected through spaced lenses and focused thereby at a common point upon a suitable screen.

It is one of the principal objects of my present invention to provide an oscillatory shutter associated with the lenses of the machine together with means actuated by the manually operable film moving mechanism for oscillating said shutter in timed relation to the film movement to thereby alternately obstruct the projection of the image bearing light beams upon the screen.

It is also another object of my invention to provide very simple means for manually moving the film over the light apertures including spur gearing, and a cam device fixed to one of the gear elements for actuating said oscillatory shutter. A further object of the invention resides in the provision of means associated with a single lamp for projecting light rays of equal intensity through the sections of the film bearing the respective rows of images.

An additional object of the invention is to provide an improved adjustable mounting for the spaced lenses whereby the images may be properly focused on the screen.

Still another object of my present improvements is to provide means whereby the image bearing film without removal from the original container in which it is sold may be easily mounted in the machine and the operating member connected therewith for rewinding the film upon upon its spool or core after exposure.

With the above and other objects in view, the invention consists in the improved motion picture projecting apparatus, and in the form, construction and relative arrangement of its several parts, as will be hereinafter more fully described, illustrated in the accompanying drawings and subsequently incorporated in the subjoined claims.

In the drawings wherein I have disclosed one simple and practical embodiment of my present present improvements, and in which similar reference characters designate corresponding parts throughout the several views, Figure 1 is a side elevation partly in section illustrating one practical construction of the apparatus;

Figure 2:
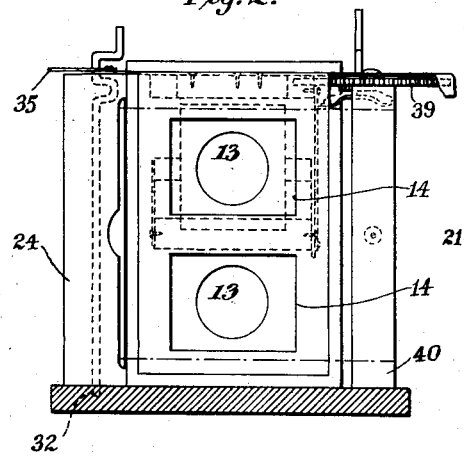
Fig. 2 is a sectional view taken substantially on the line 2—2 of Fig. 1.
Figure 3:
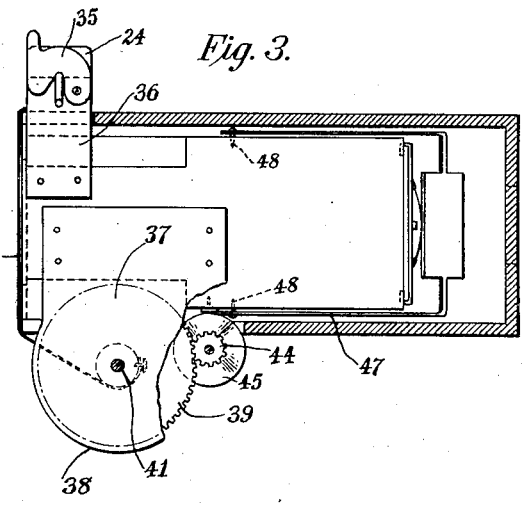
Fig. 3 is a horizontal sectional view taken on the line 3—3 of Fig. 1.

Referring in detail to the drawings, a casing indicated at 5 of suitable dimensions, is mounted upon a base 6. The front end wall of this casing has vertically spaced openings 7 therein. Within the casing 5, a frame is arranged, said frame including the metal plate 8 having the intermediate portion thereof extending longitudinally over the bottom wall of the frame provided at its opposite ends with the vertical walls or sections 9 and 10 respectively, the wall 9 being spaced from the front wall of the casing 5, while the wall 10 substantially closes the rear end of said casing. These walls 9 and 10 are rigidly connected with each other at their upper ends and their central portions by the parts 11 and 12 respectively, said parts as indicated in Fig. 2 of the drawings being of less width than the walls 9 and 10. Above and below the part 12, the front wall 9 is provided with circular openings 13 therein, while the rear wall 10 is provided with the correspondingly located rectangular openings 14.

The lenses 15 are preferably mounted over the openings 13 of wall 9 for convenient adjustment relative to said openings by attaching said lenses to the separate plate 16. As herein shown, this plate is provided at the edges of the spaced circular openings 17 therein with a plurality of clamping tongues 18. The lenses 15 are of greater diameter than the openings 17 and the tongues 18 have resilient clamping pressure upon the marginal edges of the lenses to thereby securely hold the same in accurately centered relation to the respective openings 17.

The plate 16 at each of its side edges and adjacent its upper and lower ends is provided with the bendable fingers or projections 19. The plate 16 is pivotally mounted upon the front side of the wall 9 by the pin indicated at 20 extending through said wall and fixed in the member 12. It will therefore be understood that the lens carrying plate may be pivotally adjusted on the wall 9 so as to position the lenses with their axial centers in such relation to the openings 13 that the images will be properly focused on the screen. The fingers 19 are then bent around the side edges of the wall 9 and upon the rear face thereof to thus retain the lens carrying plate in its adjusted position.

The film to be used in the machine and indicated at 21 has two rows of images shown at 22, the spaced images being in alignment across the width of the film and in relatively different postures, so that when they are successively projected upon the screen, the illusion of motion is produced. This film 21 is wound upon a wood core 23 and is sold for use in the machine in a special box or container 24 which is of rectangular form in cross section, and is provided at the juncture of adjacent side walls thereof with a longitudinally extending slot 25 having finger receiving recesses 26 in its opposite edges at the center thereof, so that the end of the film can be conveniently grasped and withdrawn through said slot.

The core 23 has a longitudinally extending bore indicated at 27 opening upon one end of said core and in substantial registration with a circular opening centrally formed in one end wall of the box 24. The other end of this bore 27 opens into a slot 28 extending diametrically across the other end of the core 23. The box 24 at this end thereof is provided with a closure flap 29 having an opening 30 therein.

The film roll in its box or container 24 is adapted to be mounted at one side of the casing 5 at its rear end, as shown in Fig. 2 of the drawings, and a winding rod 31 is then inserted in the opening 30 and downwardly through the bore 27 in the core 23 until the lower end of said rod is seated in a bearing recess indicated at 32 provided in the upper surface of the base 6. A radial projection or crank portion 33 formed in the rod 31 in spaced relation to its other end passes through the opening 30 and is positioned in the slot 28, thus preventing relative rotation between the rod and the core 23. The upper end of said rod exteriorly of the film container 24 is formed with the crank handle 34 with which a pivoted latch plate 35 mounted on the bracket 36 fixed to the top wall of the casing 5 is adapted to cooperate to prevent vertical movement of the rod relative to the film core.

A second bracket plate 37 also projects from the opposite side of the casing 5 at its upper end and has a rim or flange 38 housing the large spur gear 39 fixed to the upper end of the film winding spool 40, said upper end of said spool being rotatably engaged with a bearing pin or stud 41 on the bracket plate 37, while the lower end of said spool is mounted upon a pin or stud 42 fixed in the base 6. This spool is centrally provided with suitable means for the attachment thereto of one end of the film 21 in the manner of the ordinary photographic film camera.

One end of an operating crank 43 is journalled in the bracket plate 37 and has a pinion 44 fixed thereto and in mesh with the spur-gear 39, said pinion being of such diameter relative to the gear as to move the film across the light apertures or openings 14 in the wall 10 at the required speed.

Figure 4:
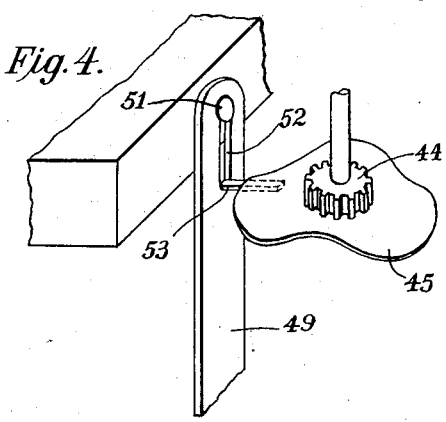
Fig. 4 is a detail perspective view of the lens shutter operating means.

A cam disc 45 is fixedly connected with the pinion 44 to rotate as a unit therewith, said disc having alternating high and low portions as indicated in Fig. 4 of the drawings. The oscillatory shutter 46, vertically movable over the front convex faces of the lenses 15, is provided at opposite sides with the rearwardly extending arms 47 pivoted near their rear ends as at 48 to the opposite edges of the member 12. A vertically movable bar 49 is pivotally connected as at 50 to the rear end of one of these arms and at its upper end is slidably engaged with the headed pin 51 fixed in the member 11, said bar having the slot 52 of suitable length and receiving said pin. At the lower end of this slot, the bar 49 is provided with the lug 53 having bearing engagement with the underside of the cam disc 45. It will be understood that the bar 49 is urged upwardly to retain lug 53 in contact with the disc 45 by the shutter 46 which tends to move by gravity to a normal position opposite the lower lens 15.

Figure 1:
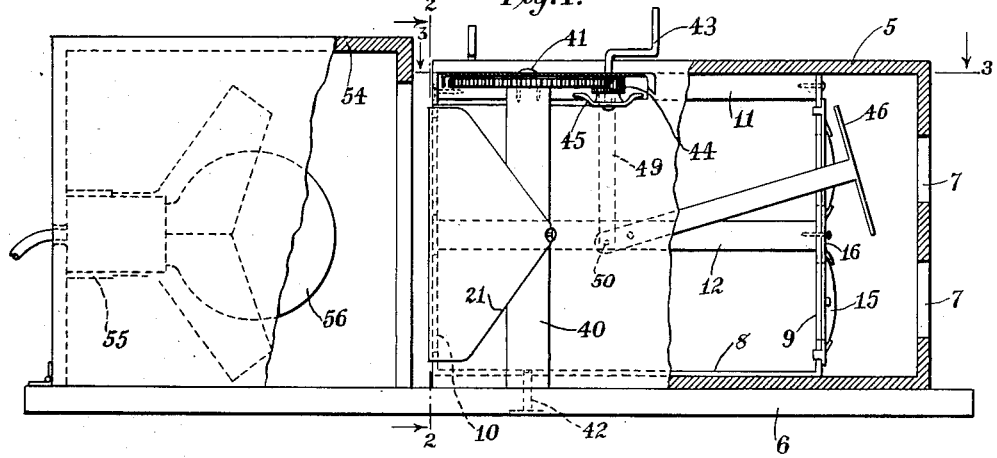
Figure 5:
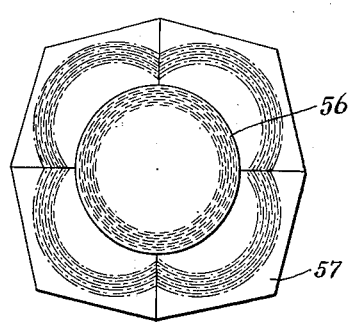
Fig. 5 is a front elevation showing the lamp bulb and reflector.
Figure 6:
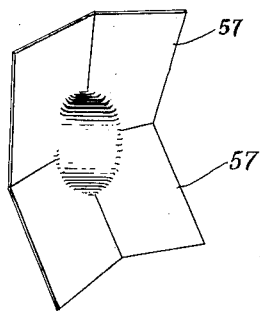
Fig. 6 is a perspective view of the reflector.
Figure 7:
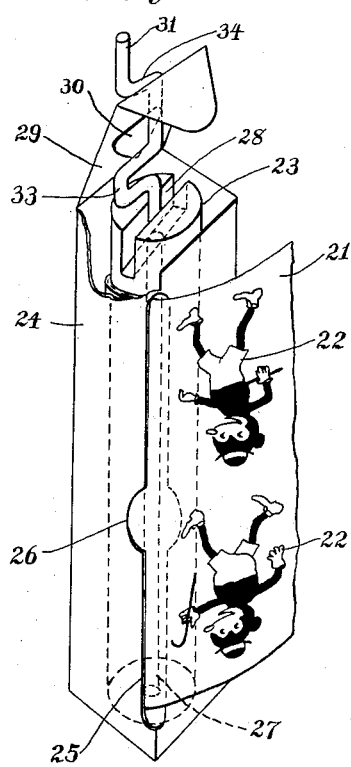
Fig. 7 is a perspective view illustrating my novel film box or container and the operating rod or member for rewinding the film.
Figure 8:
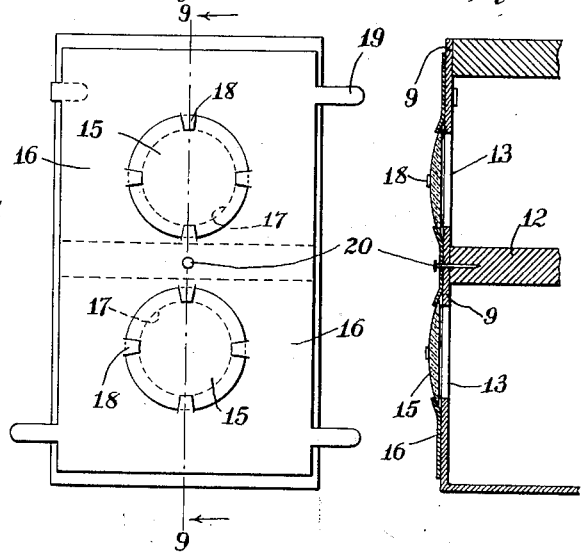
Fig. 8 is a detail elevation showing the adjustable mounting of the spaced lenses.
Figure 9:
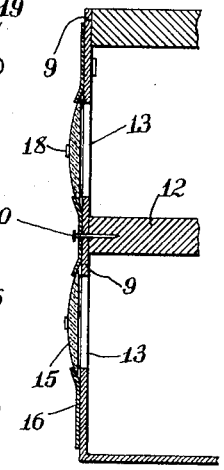
Fig. 9 is a sectional view taken on the line 9—9 of Fig. 8.

Rearwardly of the casing 5, the lamp housing 54 is mounted on the base 6. To the rear wall of this housing a suitable socket 55 is attached to receive the lamp bulb indicated at 56. Since, owing to the high heat generated within the lamp housing, it is not feasible to use separate lamp bulbs of the requisite wattage for projecting the respective rows of images on the film 21, and a single bulb centrally arranged within the housing would result in insufficient and unequally distributed projection of light rays through the two sections of the film, I provide the novel form of reflector shown in Figs. 5 and 6 of the drawings. This reflector consists of a metal disc or plate suitably mounted on the socket 55 and having quadrant sections 57 above and below the axis of the socket 55 and the lamp bulb 56 mounted therein. These quadrant sections are obliquely inclined forwardly as shown in Fig. 1, and the two sections above and below the axis of the lamp are also transversely inclined from their outer side edges to their meeting or joined edges which are positioned in a vertical plane intersecting the lamp axis. The meeting edges of the upper and lower quadrant sections at each side of the lamp socket are also radially disposed relative to the socket and positioned in a horizontal plane intersecting the axis thereof. The faces of these quadrant sections 57 of the reflector are coated with suitable material of high light-reflecting qualities. Thus light rays of substantially equal intensity will be reflected from the single bulb 56 through the sections of the film bearing the two rows of images 22 moving over the upper and lower light apertures 14 in the wall 10.

In the operation of the apparatus above described, after the film roll in its container has been mounted as explained, and the film 21 withdrawn therefrom across the outer surface of the wall 10 and attached to the spool 40, the apparatus is positioned at a predetermined distance from the screen upon which the pictures are to be projected. The crank 43 is then rotated in the proper direction to wind the film upon the spool 40. By the cooperation of the cam 45 with the lug 53, it will be understood that in this movement of the film, the shutter 46 is vertically oscillated and alternately positioned opposite the lenses 15 to obstruct the passage of the image bearing light beams. Thus although the vertically aligned images 22 on the film simultaneously register with the light apertures 14, only one image is projected at a time on the screen. The light beams being accurately focused at a common point on the screen, the images are projected successively with such rapidity as to produce the desired illusion of continuous motion by reason of the different postures of the successively projected images. After the film has been entirely projected and wound on the spool 40, the supply of current to the bulb 56 may then be cut off, and by rotating the operating rod 31, the film can be rapidly rewound on the core 23 within the container 24, it being understood that the shutter 46 will of course be idly operated through the gearing 39 and 43.

From the foregoing description considered in connection with the accompanying drawings, the construction, manner of operation and several advantages of my improved motion picture projecting apparatus will be fully and clearly understood. It will be seen that the several parts of my device are of very simple and durable construction, so that such a machine can be manufactured at relatively small cost and sold for use as a toy. The means which I have provided for easy and quick mounting of the film in operative position with respect to the projecting mechanism, requires no special understanding or skill, and enables the machine to be easily operated by a child without liability of destroying the film or damage to the mechanism.

In the foregoing description, I have referred to the several novel features of my present improvements in more or less detail. It is, however, to be understood that in the further practical development of the invention, such features, as well as the other detail structural parts of the apparatus, may be embodied in various other alternative forms. Accordingly the privilege is reserved of resorting to all such legitimate changes therein as may be fairly incorporated within the spirit and scope of the invention as claimed.

I claim:

1. In combination with a motion picture projection apparatus having a casing provided with spaced openings in an end wall thereof, lenses mounted in said casing near its opposite end and in alignment with the respective openings; a horizontal light dividing member between said openings and lenses, manually operable gearing for continuously moving a film having spaced rows of images thereon to cause said rows of images to respectively traverse one of said openings, an oscillatory shutter pivotally mounted on said light dividing member and associated with said lenses for alternately obstructing the passage of image bearing light beams projected through said lenses, a rotary cam operatively connected to one element of said gearing, and a member connected to the shutter and maintained thereby in operative contact with said cam for operating said shutter in timed relation to the movement of said film.

2. In combination with a motion picture projecting apparatus having a casing and spaced image projecting lenses; means for moving a film having spaced rows of images thereon past said lenses, including a supply roller having an axial bore therethrough and a diametrical slot in one end thereof communicating with said bore, brackets for supporting the roller on one side of said casing, a take-up roller, an oscillatory shutter for alternately obstructing the passage of the image bearing light beams through the said lenses, means for rewinding the film upon the supply roller comprising a rod having a part insertable through said brackets and said bore in the supply roller and having a radial projection, adapted to engage in said slot to render said rod non-rotatable with respect to said roller.

3. In combination with a motion picture projecting apparatus having a casing, spaced image projecting lenses, and means for alternately obstructing the passage of image bearing light beams through said lenses; means for moving a film having spaced rows of images thereon past said lenses, including a supply roller having an axial bore therethrough and a diametrical slot in one end thereof communicating with said bore, brackets for supporting said roller on said casing, a film take up roller, means for rewinding the film upon the supply roller comprising, a rod adapted to be inserted through said brackets and the bore in said supply roller, and having a radially disposed part adapted to engage in said diametrical slot to cause said supply roller to turn with said rod, and a crank on said rod whereby said rod may be manually rotated to wind the film on said supply roller, one of said brackets having a slot for the passage therethrough of said radially disposed part, and a latch plate for holding said rod in said brackets.

4. In a motion picture projecting apparatus, a casing having pairs of aligned openings in the front and rear walls thereof, a lens holder spaced from said front wall, lenses on said holder aligned with the respective openings in said wall, a horizontal partition connecting the rear wall of said casing and said lens holder to divide said casing between the lenses into separate chambers, a shutter pivoted on said partition for movement over said lenses, means for moving a film having spaced rows of images thereon past the openings in the rear wall of said casing, a cam on said film moving means, and a bar engageable by said cam and pivotally connected to said shutter for operating said shutter in timed relation to the movement of said film.

ARTHUR FRISCH.